US007055628B2

United States Patent
Grainger et al.

(10) Patent No.: US 7,055,628 B2
(45) Date of Patent: Jun. 6, 2006

(54) WELL DRILLING METHOD AND DRILLING FLUID

(75) Inventors: Neil Grainger, Stockton-on-Tees (GB); Benjamin Herzhaft, Suresnes (FR); Mark White, Whitby (GB); Annie Audibert Hayet, Croissy sur Seine (FR)

(73) Assignees: Institut Francais du Petrole, Rueil Malmaison Cedex (FR); Imperial Chemical Industries Plc, London (GB)

( * ) Notice: Subject to any disclaimer, the term of this patent is extended or adjusted under 35 U.S.C. 154(b) by 0 days.

(21) Appl. No.: 10/493,407

(22) PCT Filed: Oct. 14, 2002

(86) PCT No.: PCT/FR02/03497

§ 371 (c)(1),
(2), (4) Date: Nov. 18, 2004

(87) PCT Pub. No.: WO03/035794

PCT Pub. Date: May 1, 2003

(65) Prior Publication Data

US 2005/0082090 A1   Apr. 21, 2005

(30) Foreign Application Priority Data

Oct. 26, 2001   (GB)   ................. 0125685.8

(51) Int. Cl.
*E21B 21/06* (2006.01)
(52) U.S. Cl. ..................... 175/66; 175/64; 175/69; 507/102; 507/128
(58) Field of Classification Search ............... None
See application file for complete search history.

(56) References Cited

U.S. PATENT DOCUMENTS

| | | | |
|---|---|---|---|
| 3,297,098 A | 1/1967 | Elman et al. | |
| 4,524,002 A | 6/1985 | Hashem | |
| 4,615,813 A * | 10/1986 | Bretz | ................. 507/128 |
| 5,389,607 A | 2/1995 | Dartnell et al. | |
| 5,714,001 A | 2/1998 | Savoly et al. | |
| 6,251,836 B1 * | 6/2001 | Duncum et al. | ............ 507/90 |

FOREIGN PATENT DOCUMENTS

| | | |
|---|---|---|
| DE | 19954830 | 5/2001 |
| DE | 10035617 | 1/2002 |

* cited by examiner

*Primary Examiner*—Zakiya W. Bates
(74) *Attorney, Agent, or Firm*—Millen, White, Zelano & Branigan, P.C.

(57) ABSTRACT

A well drilling method comprises removing the drilling cuttings using an aqueous drilling fluid such as a foam including a foaming agent which includes at least one mono-(aliphatic hydrocarbyl) phosphate ester. More specifically, the drilling fluid takes the form of a potassium and/or alkanolamine and/or alkylalkanolamine salt, the foam also comprising a foam stabiliser.

28 Claims, No Drawings

WELL DRILLING METHOD AND DRILLING FLUID

This invention relates to drilling wells, particularly oil and/or gas wells, using a drilling fluid in the form of a foam.

Aqueous foam drilling fluids are typically used when wells are being drilled under so-called "underbalanced" conditions i.e. where at the drilling level, the pressure of the well fluid is lower than that in the rock surrounding the well. In typical use, the foam is made at the well head from a surfactant solution and a gas supply using commercial mixing equipment, pumped down the well bore to the region where drilling is being carried out, usually down the middle of the drill string and out into the generally annular space between drill string and well bore wall around the drilling head to envelop drilling cuttings and carry them up the annular space to the well head. The cuttings are then separated from the fluid for disposal. Foams provide good support for drilling cuttings and good cuttings removal and low formation damage potential when drilling in underbalanced conditions (when the pressure in the drilling fluid is lower than the pore pressure in the surrounding rock).

A problem with foams is that in order to act effectively as drilling fluids they must be very stable under down hole conditions and yet on return to the surface, they should be readily breakable, to avoid the need to handle large volumes of foam at the surface and to enable separation of cuttings from the drilling fluid. This change in properties is usually effected by adding defoaming chemicals to the foam which modify the composition so that, after separation from the cuttings, the liquid cannot be re-foamed for further use in drilling. Published PCT Application No WO 94/17154 A seeks to provide a reversible foam drilling fluid by using a combination of an amphoteric surfactant and either an anionic surfactant, such as an alkyl sulphate or an alkyl ether sulphate, or a cationic surfactant to generate an aqueous foam that is pH sensitive. For the amphoteric/anionic combination the foam is stable at alkali pH (>9.5) and can be collapsed at acid pH (<4) and for the amphoteric/cationic combination the foam is stable at acid pH (<4) can be collapsed at alkaline pH (>9.5). This technique suffers from the disadvantage that it requires the use of two types of surfactant, requires a wide pH swing to change between foaming and non-foaming states and produces a foam that is somewhat sensitive to the presence of hydrocarbons.

The present invention addresses the production of foam drilling fluids by using particular anionic surfactants, specifically aliphatic hydrocarbyl phosphate esters, particularly mono-aliphatic hydrocarbyl phosphate esters, to generate the foam, in particular in a way that enables the ready and repeated production and collapse of the foam under pH control. Additionally, the foams produced in the method and using the formulations of this invention can have good tolerance of hydrocarbons.

Accordingly, the present invention provides a method of drilling a well including the removal of drilling cuttings using an aqueous foam drilling fluid including a foaming agent which is or includes at least one mono-(aliphatic hydrocarbyl) phosphate ester foaming agent.

The anionic nature of the mono-(aliphatic hydrocarbyl) phosphate ester opens the possibility that foam can be generated under relatively less acidic or alkaline conditions and collapsed under more acidic conditions. The mechanism for this appears to be that the acidic groups in the phosphate ester are ionised under alkaline or weakly acidic conditions, contributing to the foaming performance of the esters, whereas under more acidic conditions the ionisation is at least partially reversed reducing the net charge on the molecule and reducing the foaming capacity of the phosphate ester. For reasons that are not clear, the change in foaming properties appears to be much more apparent in phosphate mono-esters than in di-esters and this contributes to the desirability of mono-esters and in practice the desirability of ester products having a high mono-ester content. We think that the change in net charge may change the solubility of the foaming agent so that the less charged or uncharged form is effectively removed from the foaming system by the reduction in solubility. Whatever the mechanism, the effect can be seen particularly with high mono-ester foaming agents.

Generally, the change from foaming to non-foaming character can happen over a relatively narrow pH range, often as small as or smaller than about 1 pH unit, usually on the acidic side of neutral, typically from 5 to 2.5, more usually between 3 and 4.5 pH. Foaming is promoted by higher pH levels than the minimum required and usually foaming will be carried out at a pH of at least 5, desirably at least 7.5, more usually at least 8 and desirably from 8 to 10, and particularly about 9. Foam collapse is promoted by using pH values below 4 more usually below about 3, but not usually less than about 2.

Accordingly, the invention further provides a method of drilling a well including the removal of drilling cuttings by introducing into the bore of the well an aqueous foam, formed from an aqueous solution of a foaming agent which is or includes at least one mono-(aliphatic hydrocarbyl) phosphate ester foaming agent, the aqueous phase of the foam having a pH of at least 5, and a gas; the foam lifting drilling spoil to the top of the wellbore; reducing the pH of the foam containing the drilling spoil to an acidic pH at which the foam collapses, usually to a pH below 4, to give an aqueous suspension of drilling cuttings; and separating the drilling cuttings from the suspension to give a reformed aqueous solution of the foaming agent.

The reformed aqueous solution of the foaming agent can be reused to form a foam by first increasing its pH toga level where the foaming agent is again active. The volume of the reformed aqueous solution will usually be lower than the starting volume because of adsorption on or absorption in the drilling cuttings and the concentration of foaming agent may be reduced by adsorption on the drilling cuttings. "Top up" amounts of water, foaming agent, and as necessary other system components will usually be added before reuse.

The invention thus further includes a method of drilling a well including the removal of drilling cuttings which includes the steps of:

i lifting drilling cuttings to the top of the wellbore by introducing into the bore of the well an aqueous foam, formed from an aqueous solution of a foaming agent which is or includes at least one mono-(aliphatic hydrocarbyl) phosphate ester foaming agent, the aqueous phase of the foam having a pH of at least 5, and a gas, and raising the aqueous foam to the wellhead of the wellbore;

ii reducing the pH of the foam containing the drilling cuttings to an acidic pH at which the foam collapses, usually to a pH below 4, to give an aqueous suspension of drilling cuttings;

iii separating the drilling cuttings from the suspension to give a reformed aqueous solution of the foaming agent;

iv returning the aqueous solution to step 1, as necessary adding to the aqueous solution of the foaming agent fresh ingredients including water and/or foaming agent.

The invention further includes a drilling fluid in the form of an aqueous foam which contains a foaming agent, which is or includes at least one mono-(aliphatic hydrocarbyl) phosphate ester foaming agent, particularly as a potassium and/or alkanolamine and/or an alkylalkanolamine salt, the foam additionally including a foam stabiliser, desirably as described below, particularly an alkyl ether sulphate surfactant, especially as a potassium and/or alkanolamine and/or an alkylalkanolamine salt.

The invention includes an aqueous foamable fluid containing a foaming agent, which is or includes at least one mono-(aliphatic hydrocarbyl) phosphate ester foaming agent, particularly as a potassium and/or alkanolamine and/or an alkylalkanolamine salt, and additionally including a foam stabiliser, desirably as described below, particularly an alkyl ether sulphate surfactant, especially as a potassium and/or alkanolamine and/or an alkylalkanolamine salt, the aqueous fluid having a pH of at least 5, desirably at least 7, and especially at least 8.

Desirably the mono-(aliphatic hydrocarbyl) phosphate ester is a compound of the formula (I):

$$R^1O\text{-}(EO)_n\text{---}P(O)O_2H_xCat^1_y \qquad (I)$$

where:
R$^1$ is an aliphatic hydrocarbyl group;
EO is an ethyleneoxy group
n is from 0 to 10;
Cat$^1$ is a cation having monovalent cationicity;
x is from 0 to 10;
y is from 1 to 2; and x+y=2.

It is important that the anionic phosphate ester foaming agent has a high mono-phosphate, ester content. Usually the main impurities in mono-phosphate ester products are di-esters and, normally to a lesser extent, trimesters. In this application, di-esters are less effective and may be counter productive by only weakly, if at all, contributing to foaming in alkali. Indeed they may produce more stable foam under acidic conditions, but this foam is typically less stable and has less useful properties than the foam generated by high mono-ester products. Usually the mono-ester content of the foaming agent is at least 50%, more usually at least 75%, desirably at least 80% and typically about 90% e.g. 88 to 93%, by weight. Higher proportions can be used but are likely to be significantly more expensive to manufacture.

The hydrocarbyl group, the group R$^1$ in formula (I), in the ester used as a foaming agent in this invention is desirably a $C_8$ to $C_{18}$, more usually a $C_{10}$ to $C_{16}$, and especially $C_{12}$ to $C_{14}$, hydrocarbyl group and is particularly an alkyl or alkenyl group. It can be a straight chain, branched or cycloaliphatic group, but desirably is a straight chain group e.g. a straight chain alkyl or alkenyl group. The presence of branching, particularly involving $C_2$ or longer branching chains, or cyclic groups can have adverse effects on the foaming properties of the surfactant and also may make it less readily biodegradable, thus making such groups less desirable than linear groups of equivalent molecular weight.

The hydrocarbyl group, R$^1$ in formula (I), may be linked directly to the phosphate group, as in a hydrocarbyl, particularly alkyl, phosphate ester or it may be linked through an alkyleneoxy, particularly an ethyleneoxy group. Thus, in foaming agents of the formula (I), the group (EO)$_n$, where EO and n are as defined above, may be included in the molecule, but its presence is not especially preferred and manufacture of the foaming agents will usually be simpler when n=0 i.e. the group is absent. When the ethyleneoxy chain is present the value of n is desirably from 1 to 5.

The foaming agents used in this invention, will usually be included in the drilling fluids as salts. Desirably the salt forming species, corresponding to Cat$^1$ in formula (I), is a cation having monovalent cationicity, by which phrase we mean that either the cation is monovalent i.e. viewed as an ion it carries a single positive charge, or the cation carries two or more single positive charges. Suitable monovalent cations, include alkali metal e.g. sodium or more desirably potassium, or ammonium, desirably amine onium, particularly hydroxyalkyl amine onium cations. Hydroxyalkyl amine onium cations are particularly useful in this invention and suitable sources include alkanolamines such as diethanolamine and triethanolamine, alkylalkanolamines such as alkyl(e.g. methyl or ethyl)diethanolamine and the corresponding propanolamines. Cations which carry two or more single positive charges include polyamine species.

In the formula (I) the values of x and y will depend on the extent to which acidic groups are formally neutralised and, in terms of the species actually present in the aqueous system, may vary with the pH of the aqueous system. With this variability, they may also be non-integral. Particularly where the pH has been changed the system may include "free base" forms of the cation, especially where the cation is based on ammonia or an amine.

Particularly useful phosphate ester foaming agent include mono-($C_{10/14}$ alkyl, particularly $C_{12/13}$ alkyl, especially linear alkyl) phosphate esters and particularly as the potassium salts, or very particularly as the triethanolamine salts.

The invention accordingly includes a method of drilling a well including the removal of drilling cuttings using an aqueous foam drilling fluid including a foaming agent which is or includes at least one mono-(aliphatic hydrocarbyl) phosphate ester, desirably a mono-($C_{10}$ to $C_{16}$, especially $C_{12}$ to $C_{14}$)alkyl phosphate foaming agent having a mono-ester content of at least 75%, desirably at least 80%, by weight, particularly as a potassium and/or alkanolamine and/or an alkylalkanolamine salt. An advantage of such phosphate ester foaming agents is that they can show good biodegradability and low aquatic toxicity, which makes them particularly suited to drilling in aquatic, particularly marine, environments.

A foam drilling fluid based on the mono-hydrocarbyl phosphate esters described above can give good foams that can include rheology modifiers to give good cutting carrying capacity and good tolerance of hydrocarbons; further they exhibit reasonable stability to the presence of simple electrolytes such as sodium chloride, that are commonly present in drilling fluids either as made up or salts picked up from rock formations during drilling. However, these simple foams are sensitive to the presence of multiple charge carrying electrolyte species, especially $Ca^{2+}$ and $Mg^{2+}$ such as are found in hard water. The stability of the foams when in contact with or made up using water containing such multiple charge carrying electrolyte species can be substantially improved by including a stabiliser in the aqueous foam. The foam stabiliser can be an alkyl sulphate (alcohol sulphate) surfactant, an alkyl ether sulphate surfactant, an alkyl ether phosphates which is water soluble under the likely operational pH conditions, fatty acid alkanolamide derivatives or an amine oxide.

Particularly useful alkyl ether sulphate foam stabilisers include those of the formula (II):

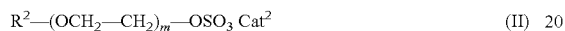

$$R^2-(OCH_2-CH_2)_m-OSO_3\ Cat^2 \qquad (II)$$

where:
  $R^2$ is a $C_8$ to $C_{16}$, more usually a $C_{10}$ to $C_{14}$, and especially a $C_{12}$ alkyl group;
  m is from 1 to 10, more usually from 2 to 5 (and may be non-integral);
  $Cat^2$ is a cation having monovalent cationicity, In such stabilisers, the cation $Cat^2$ has monovalent cationicity, as defined above. Desirably $Cat^2$ is a monovalent cation, such as alkali metal. e.g. sodium or more desirably potassium, or ammonium, desirably amine onium, particularly hydroxyalkyl amine onium cations. Hydroxyalkyl amine onium cations are particularly useful in this invention and suitable sources include alkanolamines such as diethanolamine and triethanolamine, alkylalkanolamines such as alkyl(e.g. methyl or ethyl)diethanolamine and the corresponding propanolamines. The cation $Cat^2$ may be a mixture of differing cationic species. $Cat^2$ may change with changing pH, and may sometime thus be or include $H^+$ (thus forming the carboxylic acid).

Especially useful alkyl ether sulphate surfactants include $C_{10/16}$ alkyl(especially lauryl) 2 to 5(especially 3)-ethoxy sulphates desirably as the diethanolamine or triethanolamine salts.

Useful alcohol sulphates can be of similar structure to the compounds of formula (II) with the omission of the ethyleneoxy groups, and are particularly $C_{10}$ to $C_{16}$ especially $C_{12}$ to $C_{14}$ alcohol, sulphates, typically as salts with monovalent cations such as alkali metal cations or amines, particularly potassium or and desirably diethanolamine or triethanolamine.

Water soluble alkyl ether phosphate ester foam stabilizers can be of the formula (III):

$$[R^3O-(AO)_n]_m-P(O)O_2\ Cat^3{}_k \qquad (III)$$

where:
  R3 is an aliphatic hydrocarbyl group;
  AO is an alkyleneoxy group, particularly an ethyleneoxy group;
  n is from 10 to 25 (and may be non-integral);
  m is from 1 to 2 (and may be non-integral); k is from 1 to2; suchthatk+m=3 $Cat^3$ is a cation having monovalent cationicity.

In formula (III) $R^3$ is an aliphatic hydrocarbyl group, desirably as described above for the group $R^1$ in formula (I). The alkyleneoxy chain contributes to the aqueous solubility of these foam stabilisers so AO is desirably all ethyleneoxy, but may be a mixture of ethyleneoxy and propyleneoxy groups, particularly where the molar ratio of ethyleneoxy to propyleneoxy is at least 1:1 and desirably at least 3:1. The phosphate ether ester can be a mono-ester or a di-ester, but is desirably at least mainly a mono-ester. $Cat^3$ is desirably a cation as defined for $Cat^1$ in formula (I).

Foam stabilisers which are fatty acid alkanolamide derivatives are typically of the formula(IV):

$$R^4-CONH-(AO)_m\cdot H \qquad (IV)$$

where
  $R^4$ is $C_8$ to $C_{22}$ hydrocarbyl;
  AO is alkyleneoxy; and
  m is from 2 to 10, (and may be non-integral).

The group $R^4$ can be straight or branched, saturated or unsaturated and is desirably a $C_8$ to $C_{22}$, particularly $C_{10}$ to $C_{20}$, alkyl or alkenyl group. The akyleneoxy group (OA) is desirably ethyleneoxy, propyleneoxy or desirably a combination of ethyleneoxy and propyleneoxy, especially with the AO group adjacent the amide nitrogen atom being ethyleneoxy and those further down the chain being propyleneoxy. Desirably, and especially where the group AO is a combination of ethyleneoxy and propyleneoxy as described above, m is selected to be large enough (usually just large enough) to make the product liquid at ambient temperatures.

Amine oxides used as foam stabilisers are typically $C_8$ to $C_{18}$ alkyl di-($C_1$ to $C_4$ lower alkyl, usually methyl) amine oxides.

On their own, these foam stabilisers are generally not particularly good foaming agents and do not offer any useful pH switching between foaming and non-foaming regimens. The benefits of including them in the formulations used to make in this invention include that they provide enhanced tolerance to species such as $Ca^{2+}$ and/or $Mg^{2+}$, and that they enhance the re-foaming properties of the surfactant.

The invention accordingly includes a method of drilling a well including the removal of drilling cuttings using an aqueous foam drilling fluid including a foaming agent which is or includes at least one mono-(aliphatic hydrocarbyl) phosphate ester, desirably a mono-($C_{10}$ to $C_{16}$, especially $C_{12}$ to $C_{14}$) alkyl phosphate foaming agent having a mono-ester content of at least 75%, by weight, particularly as a potassium and/or alkanolamine and/or an alkylalkanolamine salt, the foam additionally including at least one alkyl ether sulphate surfactant, particularly as a potassium and/or alkanolamine and/or an alkylalkanolamine salt.

As is described above the foaming agent and foam stabiliser are desirably in their alkanolamine forms. Where such forms are not conveniently available it may be possible to form them in situ in a foaming solution by adding a corresponding alkanolamine to the free acid form or another salt form of the foaming agent and/or foam stabiliser. If this is done then minor additional pH adjustment may be desirable.

The tolerance of the foam to polyvalent metal ions such as calcium and/or magnesium e.g. as present in hard water used to make up the foam, or dissolved in the aqueous phase during drilling through calcareous rock formations, can be further substantially improved by including a chelating agent in the aqueous fluid used to make the foam. The chelating agent is desirably ethylene diamine tetra-acetic acid (EDTA).

The EDTA will usually be added to the system as a salt, desirably of a monovalent base, e.g. an alkali metal or ammonium or amine, including amine onium, salt, desirably and conveniently as the tetrasodium salt. The amount of chelating agent, particularly EDTA, included in the aqueous fluid used to make the foam will usually depend on the concentration of calcium and/or magnesium present in the fluid e.g. from previous drilling fluid foam cycles. Desirably the concentration of chelating agent e.g. EDTA, is at least 1:1 molar based on the combined concentration of calcium and magnesium in the aqueous fluid. The expected concentration of such species that is likely to be picked up either from make up water or from rock formations during drilling is typically expected to be equivalent to from 0 to 20, more usually 1 to 15, $g.l^{-1}$ of EDTA.

The invention accordingly includes a method of drilling a well including the removal of drilling cuttings using an aqueous foam drilling fluid including a foaming agent which is or includes at least one mono-(aliphatic hydrocarbyl) phosphate ester, desirably a mono-($C_{10}$ to $C_{16}$, especially $C_{12}$ to $C_{14}$) alkyl phosphate foaming agent having a mono-ester content of at least 75%, by weight, particularly as a potassium and/or alkanolamine and/or an alkylalkanolamine salt, and a chelating agent, particularly ethylene diamine tetra-acetic acid, the foam desirably additionally including at least one alkyl ether sulphate surfactant, particularly as a potassium and/or alkanolamine and/or an alkylalkanolamine salt.

Other components of the drilling fluid can include:

solvent, such as glycerol dipropylene glycol or liquid sugars in a concentration of from about 0.2 to about 5% by weight of the drilling fluid;

rheology modifiers which are typically polymeric materials such as xanthan or similar gums or polymers and are used at addition levels of from about 0.01 to about 0.5% by weight (100 to 500 ppm) of the drilling fluid;

shale inhibitor are materials that inhibit shale swelling on contact with water. Suitable examples include carbapol resins or alkyl, particularly butyl ethers such as the ethoxylated butanol sold by Uniqema as Kemelix 7423X and the mixed ethoxylated/propoxylated butanol sold by Uniqema as Kemelix UG20WAN, typically used at addition levels of from about 0.1 to about 10%, more usually 0.5 to 5%, by weight of the drilling fluid;

lubricants or lubricity enhancers such as amine phosphate/phosphites, amine soaps or polyethylene glycols used in amounts of from 0 to 10%, usually 2 to 3% by weight of the drilling fluid; and gas hydrate inhibitors particularly for low temperature drilling, such as polyvinyl pyrrolidone and similar polymers, quaternary ammonium salts or anti-freeze fish proteins, typically used in amounts of from 0 to 20%, usually 2 to 5% by weight of the drilling fluid.

The overall composition of the drilling fluid will typically be within the following ranges:

| material | broad | ranges (parts by weight) desirable | preferable |
|---|---|---|---|
| phosphate ester | 1 to 3 | 1 to 2 | 1.5 to 2 |
| stabiliser | 0.01 to 0.1 | 0.02 to 0.08 | 0.03 to 0.06 |
| chelating agent | 0.05 to 2 | 0.1 to 1.5 | 0.75 to 1.25 |
| salt (usually NaCl) | 0.01 to 0.1 | 0.02 to 0.08 | 0.03 to 0.06 |
| water* | to 100 | to 100 | to 100 |

*after allowing for any other additives

The foam will usually be made up using air or nitrogen as the gas phase to a foam density of from 20 to 500, particularly from 50 to 250, and commonly about 100, $kg.m^3$.

In drilling wells according to the desirable re-cycling aspect of the invention, the pH of the foam/foaming materials is changed to enable the formation of a stable foam or to destabilise a foam. The pH swing range used will generally be as narrow as can conveniently be used to minimise the need to add acid and base to respectively reduce and increase the pH in the cycling method. The stability of the foam when down the well bore is clearly important and it will be normal to ensure that the pH of the foam materials at the well head before the foam is made and pumped down the well is sufficiently alkaline that contact with the rock formations through which the well is being drilled will not reduce the pH to such an extent that the foam is destabilised before it returns to the well head. With this in mind the alkaline pH of the foaming materials will usually be at least 7 and may be higher e.g. about 8, but will not usually be higher than about 10 and desirably not higher that about 9.

The foams of and used in this invention have reasonable temperature stability, but share the general reduction in stability with increasing temperature that is common to aqueous foams. The reduction in stability is usually attributed to the reduction in the viscosity of the liquid phase with temperature. Typically for aqueous foams the foam stability, as measured by half life time, falls by a factor of 5 on increasing the temperature from 25° C. to 90° C.

The materials used to change the pH to make the foam acid to destabilise it and to make it alkali so it can be re-foamed are desirably respectively strong acid and strong base. This reduces the extent of inadvertent buffering of the system. Typically the acid used will be hydrochloric acid because it is cheap, readily available and forms chloride salts on neutralisation. Among the other common strong mineral acids, other hydrogen halide acids are relatively expensive; sulphuric and phosphoric acids could be used but are less desirable, because of the risk of precipitating insoluble salts and the tendency to buffer the aqueous medium (making the pH changes more difficult to manage); and the oxidizing properties of nitric acid make it undesirable for use in such a relatively fuel rich environment. The strong base is desirably alkali metal hydroxide, particularly sodium hydroxide, though potassium hydroxide may be used although it is more-expensive.

The invention is illustrated by the following Examples. All parts and percentages are by weight unless otherwise indicated.

| Materials Code | Description |
|---|---|
| Foaming Agents: | |
| FA1 | $C_9/C_{15}$ alkyl phosphate ester (acid form): ca 70% mono-ester and ca 8% di-ester ex Uniqema |
| FA2 | $C_8/C_{10}$ alkyl $(EO)_5$ phosphate ester (acid form) ca 56% mono-ester and ca 38% di-ester ex Uniqema |
| FA3 | $C_{10}$ alkyl $(EO)_5$ phosphate ester (acid form): ca 72% mono-ester and ca 10% di-ester ex Uniqema |
| FA4 | $C_{12}/C_{13}$ alkyl phosphate ester (K form): ca 75% mono-ester and ca 8% di-ester ex Uniqema |
| FA5 | $C_{12}/C_{13}$ alkyl phosphate ester (triethanolamine form): ca 75% mono-ester and ca 8% di-ester ex Uniqema |
| CFA1 | ADS a commercial foaming agent ex Air Drilling Services |

-continued

| Stabilisers | |
|---|---|
| S1 | lauryl 3-EO sulphate diethanolamine salt ex Uniqema |
| Other Components | |
| Oil1 | mineral oil Soltrol ex Phillips Chemicals: Visc (20° C.) 20 mPa · s; 0.9% by vol. aromatics |
| Oil2 | mineral oil Marcol ex Esso: Visc (20° C.) 10 mPa · s; 0% aromatics |
| Oil3 | high aromatic crude oil: Visc (20° C.) 318 mPa · s; 56% by vol. aromatics |
| Oil4 | medium aromatic crude oil: Visc (20° C.) 8 mPa · s; 38% by vol. aromatics |
| Cell1 | polyanionic cellulose polymer Aquapac ex Aqualon |
| Sol1 | load clay (to simulate drilling cuttings) HiModPrima ex Dowell |

Brine compositions:

Composition (millimolar concentration)

| Brine | CaCl2 | NaCl | KCl | MgSO4 | NaHCO3 | Na2SO4 | MgCl2 |
|---|---|---|---|---|---|---|---|
| A | 10.8 | 478 | 17.4 | 29.2 | — | — | 23.6 |
| B | 11.8 | 405 | 11.8 | — | 23.8 | 28.4 | — |

The brines are solutions made up to mimic the use of seawater in making up drilling fluids.

Test Methods

Foam Stability (Life)

A solution of foaming agent was made up by adding an amount of the foaming agent to 200 ml of an aqueous medium (distilled water containing various amounts of sodium chloride) in a graduated 3 litre vessel. The pH of this solution was adjusted to a predetermined value, with concentrated sodium hydroxide or hydrochloric acid as necessary, and the solution agitated using a Janke and Kunkel blender, at 2000 rpm (ca 33 Hz) for 2 minutes. The resulting foam volume (FV) in I was noted and the foam then transferred to a 3 litre graduated conical vessel. On completion of foam transfer a stop watch was started 15 and the time taken in minutes for the amount of drainage liquid to reach 100 ml was recorded as the foam "half-life" (HL). The drainage rate (DR) in ml per minute was also recorded. All tests were conducted at ambient temperature, unless otherwise stated.

Foam Rheology—was investigated on a foam made up as described above, but using 50 ml of the foaming solution. The foam was tested on a Haake RT20 rheometer using a grooved 35 mm plate-plate geometry with a gap of 2 mm. A constant shear stress was applied for 600 seconds during and the shear rate was measured. For each shear stress, after 500 seconds, the shear rate is, noted (having reached a constant value) and Shear Stress (SS in Pa) was plotted against Shear Rate (SR in $sec^{-1}$).

Fluid Loss—was measured using an API (American Petroleum Institute) standard method and apparatus, by static filtration in a high pressure high temperature (HPHT) cell using a 50 mm filter paper and a pressure of 7 bar (ca 0.7 MPa) under Nitrogen at a temperature of 25+ C. The filtrate volume was recorded as a function of time for 30 minutes. The results are given as the Filtrate Volume (FLFV) in ml and the time to reach the filtrate volume quoted as the square root of the time in minutes $FLT^{1/2}$.

EXAMPLE 1

Samples of foaming agents were tested at varying concentrations in the presence of varying concentrations of sodium chloride and at various pH's (of the foamable solution). The formulations and the results of assessing the foams generated are set out in Table 1 below:

TABLE 1

| | Foaming Agent | | | | | |
|---|---|---|---|---|---|---|
| Ex No | type | conc. (wt %) | NaCl conc. (mol. $l^{-1}$) | pH | FV (l) | HL (min) | DR (ml. $min^{-1}$) |
| 1.1 | FA1 | 2 | 0.01 | 9 | 1.9 | 16 | 7.7 |
| 1.2 | FA1 | 2 | 0.1 | 9 | 2.0 | 28 | 2.5 |
| 1.3 | FA1 | 2 | 1 | 9 | 2.2 | 95 | 1.0 |
| 1.4 | FA2 | 1 | 0.01 | 9 | 2.0 | — | 17 |
| 1.5 | FA2 | 1 | 0.01 | 3 | 1.75 | — | 15 |
| 1.6 | FA3 | 2 | 0.01 | 9 | 1.75 | — | 22.5 |
| 1.7 | FA3 | 2 | 0.01 | 3 | 2.00 | — | 17.5 |
| 1.8 | FA1 | 2 | 0.01 | 9 | 1.9 | 16 | 7.7 |
| 1.9 | FA1 | 2 | 0.01 | 3 | 1.75 | 13 | 10.1 |
| 1.10 | FA1 | 2 | 0.1 | 9 | 2.0 | 28 | 2.5 |
| 1.11 | FA1 | 2 | 0.1 | 3 | 1.6 | 12 | 10.8 |
| 1.12 | FA1 | 2 | 1 | 9 | 2.2 | 95 | 1.0 |
| 1.13 | FA1 | 2 | 1 | 3 | 2.2 | 140 | 0.7 |

These data indicate that increasing the concentration of sodium chloride results in increased foam stability. However, some of these foams do not show pH dependence, though foams made using FA1 show some pH dependence but loose this at higher salinity.

EXAMPLE 2

Foams were made up using FA4 or FA5 as the foaming agent from surfactant solutions at various sodium chloride concentrations, with the pH of the solution prior to foaming adjusted to 9 or 3. The results in terms of the drainage rate are set out in Table 2 below. It is notable that these foams show marked pH dependence.

TABLE 2

| Ex No | Foaming Agent type | wt % | pH | NaCl Conc. (mol. $l^{-1}$) | DR (ml. $min^{-1}$) |
|---|---|---|---|---|---|
| 2.1.1 | FA3 | 2 | 9 | 0.01 | 10 |
| 2.1.2 | FA3 | 2 | 3 | 0.01 | N/A* |
| 2.2.1 | FA3 | 2 | 9 | 0.5 | 4.5 |
| 2.2.2 | FA3 | 2 | 3 | 0.5 | N/A* |
| 2.3.1 | FA3 | 2 | 9 | 1 | 5.5 |
| 2.3.2 | FA3 | 2 | 3 | 1 | N/A* |
| 2.4.1 | FA4 | 2 | 9 | 0.01 | 11 |
| 2.4.2 | FA4 | 2 | 3 | 0.01 | N/A* |
| 2.5.1 | FA4 | 2 | 9 | 0.5 | 5.5 |
| 2.5.2 | FA4 | 2 | 3 | 0.5 | N/A* |
| 2.6.1 | FA4 | 2 | 9 | 1 | 4.5 |
| 2.6.2 | FA4 | 2 | 3 | 1 | N/A* |

*DR was not measurable because at pH3 the solution did not form a foam.

EXAMPLE 3

The effect of different electrolytes on foam made using FA1 as the foaming agent was assessed. The electrolytes were included in the solution used to make up the foams. The formulations and results are set out in Table 3 below:

TABLE 3

| Ex No | Foaming Agent type | wt % | Electrolyte type | mol. l$^{-1}$ | pH | FV (l) | HL (min) | DR (ml. min$^{-1}$) |
|---|---|---|---|---|---|---|---|---|
| 3.1.1 | FA1 | 2 | NaCl | 0.01 | 9 | 1.9 | 16 | 7.7 |
| 3.1.2 | FA1 | 2 | NaCl | 0.5 | 9 | 2.2 | 84 | 0.8 |
| 3.1.3 | FA1 | 2 | NaCl | 1 | 9 | 2.2 | 95 | 1.0 |
| 3.2.1 | FA1 | 2 | CaCl$_2$ | 0.01 | 9 | 1.7 | 16.5 | 6.5 |
| 3.2.2 | FA1 | 2 | CaCl$_2$ | 0.02 | 9 | none | N/A | N/A |
| 3.2.3 | FA1 | 2 | CaCl$_2$ | 0.05 | 9 | none | N/A | N/A |
| 3.2.4 | FA1 | 2 | CaCl$_2$ | 0.5 | 9 | none | N/A | N/A |
| 3.3 | FA1 | 2 | KCl | 0.5 | 9 | 2.0 | 6 | 20.1 |
| 3.4 | FA1 | 2 | LiCl | 0.5 | 9 | none | N/A | N/A |

EXAMPLE 4

The effect of contamination of pre-made foams was assessed by making up foams as described above, using sodium chloride containing water, and subsequently adding the test contaminant, an aqueous solution of calcium chloride or synthetic seawater (Brine A), to the foam in an amount to just break the foam. The amount of the contaminant needed to achieve this was recorded, in g.l$^{-1}$ for CaCl$_2$ and in wt % for seawater. The formulations and results are set out in Table 4 below.

TABLE 4

| Ex No | Foaming Agent type | wt % | NaCl mol. l$^{-1}$ | Contaminant type | amount | pH |
|---|---|---|---|---|---|---|
| 4.1 | FA4 | 2 | 0.5 | CaCl$_2$ | 1 | 9 |
| 4.2 | FA4 | 2 | 1 | CaCl$_2$ | 1 | 9 |
| 4.3 | FA4 | 2 | 1 | Sea | 1 | 9 |
| 4.4 | FA5 | 2 | 0.5 | CaCl$_2$ | 2 | 9 |
| 4.5 | FA5 | 2 | 1 | CaCl$_2$ | 3 | 9 |
| 4.6 | FA5 | 2 | 1 | Sea | 1 | 9 |

EXAMPLE 5

The effect of temperature on foam stability was assessed by making and testing foams at controlled temperatures. The formulations and results are set out in Table 5 below.

TABLE 5

| Ex No | Foaming Agent type | wt % | Electrolyte type | mol. l$^{-1}$ | pH | Temp (°C.) | HL (min) | DR (ml. min$^{-1}$) |
|---|---|---|---|---|---|---|---|---|
| 5.1 | FA5 | 2 | NaCl | 1 | 9 | 25 | 18 | 5 |
| 5.2 | FA5 | 2 | NaCl | 1 | 9 | 50 | 9 | 7 |
| 5.3 | FA5 | 2 | NaCl | 1 | 9 | 70 | 5 | 12 |
| 5.4 | FA5 | 2 | NaCl | 1 | 9 | 90 | 4 | 32 |

EXAMPLE 6

The effect of hydrocarbon contamination on foams was assessed by adding various amounts of oils to the foam made as described above or to the solution used to make up the foam. These tests simulate the effect of hydrocarbon (oil) contamination from an oil bearing layer through which the bore is being drilled and test results are set out in Table 6 below.

TABLE 6

| Ex No | Foaming Agent type | wt % | Electrolyte type | mol. l$^{-1}$ | pH | Oil type | ml | Effect |
|---|---|---|---|---|---|---|---|---|
| 6.1 | FA1 | 2 | NaCl | 1 | 9 | Oil1 | 330 | no foam breaking after contamination |
| 6.2 | FA4 | 2 | NaCl | 1 | 9 | Oil2 | 500 | no foam breaking after contamination |
| 6.3 | FA5 | 2 | NaCl | 1 | 9 | Oil2 | 500 | no foam breaking after contamination |
| 6.4 | FA5 | 2 | NaCl | 1 | 9 | Oil2 | 100* | foam HL increased from 25 to 60 min |
| 6.5 | FA4 | 2 | NaCl | 1 | 9 | Oil2 | 100* | foam HL increased from 25 to 60 min |

*added before foaming

EXAMPLE 7

This Example illustrates the effect of including a cellulose polymer to modify the rheology of the foam. Various amount of Cell1 were added to the solution used to make up the foam and the resultant foams were tested for HL and DR. The addition of the polymer improves the stability of the foam. The formulations and test results are set out in Table 7 below.

TABLE 7

| Ex | Foaming Agent | | Electrolyte | | | Cell1 | HL | DR |
|---|---|---|---|---|---|---|---|---|
| No | type | wt % | type | mol. l$^{-1}$ | pH | (g) | (min) | (ml. min$^{-1}$) |
| 5.1.1 | FA5 | 2 | NaCl | 1 | 9 | 0 | 25 | 4.9 |
| 5.1.2 | FA5 | 2 | NaCl | 1 | 9 | 1 | 55 | 2.0 |
| 5.1.3 | FA5 | 2 | NaCl | 1 | 9 | 2 | 80 | 0.5 |
| 5.1.4 | FA5 | 2 | NaCl | 1 | 9 | 3 | 240 | 0.4 |

TABLE 7-continued

| Ex | Foaming Agent | | Electrolyte | | | Cell1 | HL | DR |
|---|---|---|---|---|---|---|---|---|
| No | type | wt % | type | mol. l$^{-1}$ | pH | (g) | (min) | (ml. min$^{-1}$) |
| 5.2.1 | FA4 | 2 | NaCl | 1 | 9 | 0 | 20 | 5.8 |
| 5.2.2 | FA4 | 2 | NaCl | 1 | 9 | 1 | 80 | 0.8 |

EXAMPLE 8

This Example illustrates the inclusion of a stabiliser as a way to improve foam stability when contaminated by calcium (as chloride) using the method described above the formulations and test results are set out in Table 8 below.

TABLE 8

| Ex | Foaming Agent | | Stabiliser | | NaCl | CaCl$_2$ | | FV | |
|---|---|---|---|---|---|---|---|---|---|
| No | type | wt % | type | wt % | (mol. l$^{-1}$) | (g.l$^{-1}$) | pH | (l) | Effect |
| 8.1.1 | FA4 | 2 | — | 0 | 1 | 1 | 9 | N/A | foam breaks |
| 8.1.2 | FA4 | 1.7 | S1 | 0.3 | 1 | 1 | 9 | 1.0 | |
| 8.2.1 | FA5 | 2 | — | 0 | 1 | 3 | 9 | N/A | foam breaks |
| 8.2.2 | FA5 | 1.7 | S1 | 0.3 | 1 | 3 | 9 | 0.9 | |

EXAMPLE 9

Addition of chelating agent as a way to improve foam stability when contaminated by calcium or seawater at pH 9. The results are set out in Table 9.

TABLE 9

| Ex | Foaming Agent | | Stabiliser | | NaCl | EDTA | CaCl$_2$ | Amount to break foam | |
|---|---|---|---|---|---|---|---|---|---|
| | | | | | | | | Brine A | Brine B |
| No | type | wt % | type | wt % | (mol. l$^{-1}$) | (g.l$^{-1}$) | (g.l$^{-1}$) | (ml. l$^{-1}$) | (ml. l$^{-1}$) |
| 9.1 | FA5 | 1.95 | S1 | 0.05 | 1 | 3.16 | 2.4 | 320 | 1850 |
| 9.2 | FA5 | 1.95 | S1 | 0.05 | 1 | 6.32 | 3.8 | 450 | |

EXAMPLE 10

In this Example the compatibility of foams with rheology modifiers and drilling cuttings is assessed. The formulations used and the properties measured are set out in table 9 below.

TABLE 10

| Ex | Foaming Agent | | NaCl | Cell1 | Sol1 | | HL | DR |
|---|---|---|---|---|---|---|---|---|
| No | type | wt % | (mol. l$^{-1}$) | (g.l$^{-1}$) | (g.l$^{-1}$) | pH | (min) | (ml. min$^{-1}$) |
| 10.1.1 | FA5 | 2 | 1 | 3 | — | 9 | 238 | 0.42 |
| 10.1.2 | FA5 | 2 | 1 | 3 | 28.5 | 9 | 216 | 0.64 |
| 10.2.1 | FA4 | 2 | 1 | 3 | — | 9 | 93 | 0.76 |
| 10.2.2 | FA4 | 2 | 1 | 3 | 28.5 | 9 | 4 | 26.33 |

EXAMPLE 11

The filtration properties of foams was assessed to evaluate the tendency for fluid loss into surrounding porous strata in the event that the pressure in the fluid accidentally exceeds that in the rock formation (accidental overbalance). The formulations tested and the test results are set out in Table 11 below.

TABLE 11

| Ex No | Foaming Agent type | wt % | NaCl (mol.l$^{-1}$) | Cell1 (g.l$^{-1}$) | Sol1 (g.l$^{-1}$) | pH | FLFV (ml) | FLT$^{1/2}$ |
|---|---|---|---|---|---|---|---|---|
| 11.1.1 | FA5 | 2 | 1 | 3 | 5 | 9 | 9 | 2.5 |
| 11.1.2 | | | | | | | 12 | 3.75 |
| 11.1.3 | | | | | | | 14 | 5 |
| 11.2.1 | FA5 | 2 | 1 | 3 | 28.5 | 9 | 2 | 2.5 |
| 11.2.2 | | | | | | | 4 | 3.75 |
| 11.2.3 | | | | | | | 6 | 5 |

EXAMPLE 12

The rheological properties of various foams was measured using the method described above. The materials tested and the results of testing are set out in Table 12 below.

TABLE 12

| Ex No | Foaming Agent | SS (Pa) | SR (sec$^{-1}$) |
|---|---|---|---|
| 12.1.1 | FA4 | 65 | 20 |
| 12.1.2 | | 72 | 50 |
| 12.1.3 | | 82 | 100 |
| 12.1.4 | | 82 | 120 |
| 12.2.1 | FA5 | 49 | 20 |
| 12.2.2 | | 68 | 50 |
| 12.2.3 | | 78 | 100 |
| 12.2.4 | | 79 | 120 |
| C12.1.1 | ADS | 55 | 20 |
| C12.1.2 | | 70 | 50 |
| C12.1.3 | | 79 | 100 |
| C12.1.4 | | 83 | 120 |

EXAMPLE 13

This Example simulates using a foaming solution through a series of foaming/breaking/re-foaming cycles and examines the foam properties after various numbers of cycles. The foam was formed as described above at pH 9; broken by adjusting the pH to about 1 using concentrated HCl solution; and returned to pH 9 for re-foaming using concentrated NaOH solution. The formulation composition and properties are set out in Table 13 below.

TABLE 13

| Ex No | Foaming Agent type | wt % | NaCl (mol. l$^{-1}$) | Cycle No | DR (ml. min$^{-1}$) | HL (min) |
|---|---|---|---|---|---|---|
| 13.1 | FA5 | 2 | 1 | 1 | 0.5 | 260 |
| 13.2 | | | | 2 | 0.65 | 190 |
| 13.3 | | | | 3 | 0.69 | 180 |
| 13.4 | | | | 4 | 0.85 | 160 |

EXAMPLE 14

In this Example, the effect of chelating/sequestering agents on foam properties when Ca ions are present is assessed. A foam was made up by first dissolving 2% by wt of surfactant (foaming agent plus stabiliser) and 1-1.7 g NaCl (to give 1 molar concentration) in 200 ml distilled water, adjusting the pH to 9 with concentrated NaOH solution, and then using 100 ml of the test solution, generating a foam in a graduated cylinder using a Waring Blender for 1 minute on the low setting. The maximum foam height and the foam half life were measured. The foaming was repeated using a solution to which had been added 1.2 g.l$^{-1}$ CaCl$_2$ (as 2.4 g.l$^{-1}$ CaCl$_2$.6H$_2$0) and varying amounts of sequestering agent. As necessary the pH was adjusted to 9 for foaming using concentrated NaOH solution. For some foams the effect of collapsing the foam by acidification as described in Example 13, and then adjusting the pH to 9 and re-foaming was assessed and results are given as the volume % of the foam re-formed (Re-FV %). The formulations and test results are given in Table 14 below.

TABLE 14

| Ex No | Foaming Agent type | % | Stabiliser type | % | CaCl2 g.l$^{-1}$ | EDTA g/l$^{-1}$ 1 | Ratio Ca:EDTA | FH (cm) | HL (min) | Re—FV (%) |
|---|---|---|---|---|---|---|---|---|---|---|
| 14.1.1 | FA5 | 2 | S1 | 0 | 0 | 0 | — | 16.2 | 10.42 | — |
| 14.1.2 | | 1.90 | | 0.1 | | 0 | | 12.6 | 7.1 | — |
| 14.1.3 | | 1.80 | | 0.2 | | | | 13 | 4.95 | — |
| 14.1.4 | | 1.50 | | 0.5 | | | | 8.7 | 1.9 | — |
| 14.1.5 | | 0 | | 2 | | | | 4.9 | 0.75 | — |
| 14.2.1 | FA5 | 2 | S1 | 0 | 1.2 | — | — | 0 | 0 | — |

TABLE 14-continued

| Ex No | Foaming Agent type | % | Stabiliser type | % | CaCl2 g.l⁻¹ | EDTA g/l⁻¹ | Ratio Ca:EDTA | FH (cm) | HL (min) | Re—FV (%) |
|---|---|---|---|---|---|---|---|---|---|---|
| 14.2.2 | | 1.90 | | 0.1 | | | | 0 | 0 | — |
| 14.2.3 | | 1.80 | | 0.2 | | | | 0 | 0 | — |
| 14.2.4 | | 1.50 | | 0.5 | | | | 0 | 0 | — |
| 14.2.5 | | 0 | | 2 | | | | 5 | 0.65 | — |
| 14.3.1 | FA5 | 2 | S1 | 0 | 1.2 | 3.18 | 1:1 | 9.75 | 4 | 60 |
| 14.3.2 | | 1.90 | | 0.1 | | | | 11.6 | 4.17 | 92 |
| 14.3.3 | | 1.80 | | 0.2 | | | | 9.4 | 3.93 | 72 |
| 14.3.4 | | 1.50 | | 0.5 | | | | 10.2 | 2.35 | 117 |
| 14.3.5 | | 0 | | 2 | | | | — | — | — |
| 14.4.1 | FA4 | 2.0 | S1 | 0 | 0 | 0 | — | 16.0 | 14.6 | — |
| 14.4.2 | | 1.9 | | 0.1 | | | | 14.9 | 6.92 | — |
| 14.4.3 | | 1.5 | | 0.5 | | | | 8.5 | 2.25 | — |
| 14.5.1 | FA4 | 2.0 | S1 | 0 | 1.2 | — | | 0 | 0 | — |
| 14.5.2 | | 1.9 | | 0.1 | | | | 0 | 0 | — |
| 14.5.3 | | 1.5 | | 0.5 | | | | 0 | 0 | — |
| 14.6.1 | FA4 | 2.0 | S1 | 0 | 1.2 | 3.18 | 1:1 | 11.2 | 7.8 | 70 |
| 14.6.2 | | 1.9 | | 0.1 | | | | 7.0 | 1.75 | 47 |
| 14.6.3 | | 1.5 | | 0.5 | | | | 7.0 | 1.58 | 82 |

EXAMPLE 15

In this Example foams were made and tested with pH cycling and the addition of Ca species. The foams were made as described for the foam stability test, from a solution of the formulation components adjusted to pH 9 and Foam Height and Half Life measured to give "Initial" values. The pH was adjusted to 3 by adding acid to completely collapse the foams; alkali was then added to adjust the pH to 9 and the foams reformed and Foam Height and Half Life measured to give "Cycle 1" values. CaCl$_2$.6H$_2$0 was then added and mixed in to give a concentration of CaCl$_2$ of 1.2 g.l⁻¹; the pH was adjusted to 9 and the formulations were re-foamed and tested to give "Cycle 1a" values. The additions of acid to collapse the foams, addition of alkali, re-foaming and re-testing were repeated to give "Cycle 2" results. The formulations used are set out in Table 15a and the measured foam properties are set out in Table 15b below.

TABLE 15a

| Ex No | Foaming Agent type | wt % | Stabiliser type | wt % | EDTA (g.l⁻¹) |
|---|---|---|---|---|---|
| 14.1 | FA4 | 2 | — | — | 3.18 |
| 14.2 | FA4 | 1.9 | S1 | 0.1 | 3.18 |

TABLE 15b

| | Foam Properties | | | | | | | |
|---|---|---|---|---|---|---|---|---|
| | Initial | | Cycle 1 | | Cycle 1a | | Cycle2 | |
| Ex No | FH (cm) | HL (min) | FH (cm) | HL (min) | FH (cm) | HL (min) | FH (cm) | HL (min) |
| 14.1 | 16.3 | 12.03 | 12 | 11.02 | 8 | 1.8 | 7.5 | 0.75 |
| 14.2 | 16.7 | 8.53 | 16.5 | 7.37 | 5.2 | 1.0 | 5.5 | 0.55 |

EXAMPLE 16

The stability of foams including anionic cellulosic polymeric thickener on contamination with various oils was investigated using a pH 9 aqueous foaming solution containing 1.95% of FA1, 0.05% of S1, 1 molar NaCl (ca 58.5 g.l⁻¹) and 3.16 g.l⁻¹ EDTA. Test foams were made up, as for the foam stability test, and oil added under gentle agitation until the foam collapsed. The volume percentage of this amount of oil relative to total foam volume was calculated and reported as a measure of foam stability with oil contamination. The Results are set out in Table 16 below. These data show the inclusion of cellulosic polymer adds to foam stability even in the presence of highly aromatic oils. Similar foams were made up using a higher concentration of EDTA (9.48 g.l⁻¹) to give products suitable for use in environments having a high level of Ca contamination and having similar oil tolerance.

TABLE 16

| | Polymer | | Oil | |
|---|---|---|---|---|
| Ex No | type | g.l⁻¹ | type | vol % |
| 16.1.1 | — | 0 | Oil1 | 2.8 |
| 16.1.2 | — | 0 | Oil2 | >20 |
| 16.1.3 | — | 0 | Oil3 | <0.5 |
| 16.1.4 | — | 0 | Oil4 | 2.75 |
| 16.2.1 | Cell1 | 1 | Oil1 | 9.5 |
| 16.2.2 | Cell1 | 1 | Oil2 | >20 |
| 16.2.3 | Cell1 | 1 | Oil3 | 5.75 |
| 16.2.4 | Cell1 | 1 | Oil4 | 6.25 |
| 16.3.1 | Cell1 | 3 | Oil3 | 7.75 |

The invention claimed is:

1. A method of drilling a well, comprising removing drilling cuttings with an aqueous foam drilling fluid, said drilling fluid including a foaming agent comprising at least one mono-(aliphatic hydrocarbyl) phosphate ester, and a foam stabilizer comprising a member selected from the group consisting of an alkyl ether sulphate, a fatty acid alkanolamide derivative, and an amine oxide.

2. A method as claimed in claim 1 wherein the phosphate ester foaming agent has a mono-ester content of at least 75%.

3. A method as claimed in claim 1 wherein the phosphate ester is a compound of the formula (I):

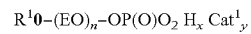

where:
R$^1$ is an aliphatic hydrocarbyl group;
EO is an ethyleneoxy group
n is from 0 to 10;
Cat$^1$ is a cation having monovalent cationicity;
x is from 0 to 1;
y is from 1 to 2; and x+y=2.

4. A method as claimed in claim 3 wherein Cat$^1$ is a potassium ion or a cation derived from an alkanolamine.

5. A method as claimed in claim 4 wherein Cat$^1$ is an alkanolamine selected from the group consisting of diethanolamine, triethanolamine, methyldiethanolamine and ethyldiethanolamine.

6. A method as claimed in claim 1 wherein the foam stabilizer comprises an alkyl ether sulphate surfactant of the formula:

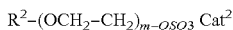
R$^2$–(OCH$_2$–CH$_2$)$_{m-OSO3}$ Cat$^2$ where:
R$^2$ is a C$_8$ to C$_{16}$, more usually a C$_{10}$ to C$_{14}$, and especially a C$_{12}$, alkyl group;
m is from 1 to 10,
Cat$^2$ is a cation having monovalent cationicity.

7. A method as claimed in claim 6 wherein Cat$^2$ is a potassium ion or a salt forming species derived from an alkanolamine.

8. A method as claimed in claim 7 wherein Cat$^2$ comprises an alkanolamine is selected from the group consisting of diethanolamine, triethanolamine, methyldiethanolamine and ethyldiethanolamine.

9. A method according to claim 6 wherein m is 2 to 5.

10. A method as claimed in claim 1 wherein the foam stabilizer comprises a fatty acid alkanolamide derivative of the formula (IV):

R$^4$–CONH–(AO)$_m$H     (IV)

where
R$^4$ is C$_8$ to C$_{22}$ hydrocarbyl;
AO is alkyleneoxy; and
m is from 1 to 10.

11. A method as claimed in claim 1 which includes the removal of drilling cuttings by introducing into the bore of the well an aqueous foam, formed from an aqueous solution of a foaming agent which includes at least one mono-(aliphatic hydrocarbyl) phosphate ester foaming agent, the aqueous phase of the foam having a pH of at least 5, and a gas; the foam lifting drilling spoil to the top of the wellbore; reducing the pH of the foam containing the drilling spoil to a sufficiently acidic pH at which the foam collapses, to give an aqueous suspension of drilling cuttings; and separating the drilling cuttings from the suspension to give a reformed aqueous solution of the foaming agent.

12. A method as claimed in claim 11 in which the aqueous phase of the foam has a pH of at least 7, desirably at least 8, and the acidic pH is not more than 3.

13. A method according to claim 11 wherein the pH at which the foam collapses is below 4.

14. A method as claimed in claim 1 which includes the steps of:
i lifting drilling cuttings to the top of the wellbore by introducing into the bore of the well an aqueous foam, formed from an aqueous solution of a foaming agent which includes at least one mono-(aliphatic hydrocarbyl) phosphate ester foaming agent, the aqueous phase of the foam having a pH of at least 5, and a gas, and raising the aqueous foam to the wellhead of the wellbore;

ii reducing the pH of the foam containing the drilling cuttings to an acidic pH at which the foam collapses, to give an aqueous suspension of drilling cuttings;
iii separating the drilling cuttings from the suspension to give a-reformed aqueous solution of the foaming agent;
iv returning the aqueous solution to step i, as necessary adding to the aqueous solution of the foaming agent fresh ingredients including water and/or foaming agent.

15. A drilling fluid in the form of an aqueous foam which contains a foaming agent comprising at least one mono-(aliphatic hydrocarbyl) phosphate ester, the foam additionally including a foam stabilizer selected from the group consisting of an alkyl ether sulphate, a fatty acid alkanolamide derivative, and an amine oxide.

16. A drilling fluid according to claim 15 wherein the phosphate ester comprises a potassium and/or alkanolamine and/or alkylalkanolamine salt.

17. A drilling fluid according to claim 15 wherein the at least one mono-(aliphatic hydrocarbyl) phosphate ester comprises a compound of formula (I)

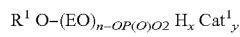
R$^1$ O–(EO)$_{n-OP(O)O2}$ H$_x$ Cat$^1_y$ where:
R$^1$ is an aliphatic hydrocarbyl group;
EQ is an ethyleneoxy group
n is from 0 to 10;
Cat$^1$ is a cation having monovalent cationicity;
x is from 0 to 1;
y is from 1 to 2; and x+y=2.

18. A drilling fluid as claimed in claim 17 wherein Cat$^1$ is a potassium ion or a cation derived from an alkanolamine.

19. A drilling fluid as claimed in claim 18 comprising an alkanolamine selected from the group consisting of diethanolamine, triethanolamine, methyldiethanolamine and ethyldiethanolamine.

20. A drilling fluid according to claim 15 wherein the foam stabilizer comprises an alkyl ether sulphate surfactant of the formula:

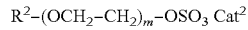
R$^2$–(OCH$_2$–CH$_2$)$_m$–OSO$_3$ Cat$^2$ where:
R$^2$ is a C$_8$ to C$_{16}$, more usually a C$_{10}$ to C$_{14}$, and especially a C$_{12}$, alkyl group;
m is from 1 to 10,
Cat$_2$ is a cation having monovalent cationicity.

21. A drilling fluid according to claim 15 wherein the foam stabilizer comprises a fatty acid alkanolamide derivative of the formula (IV):

R$^4$–CONH–(AO)$_m$H     (IV)

where
R$^4$ is C$_8$ to C$_{22}$ hydrocarbyl;
AO is alkyleneoxy; and
m is from 1 to 10.

22. An aqueous foamable fluid containing a foaming agent, at least one mono-(aliphatic hydrocarbyl) phosphate ester foaming agent, and additionally including a foam stabilizer selected from the group consisting of an alkyl ether sulphate, a fatty acid alkanolamide derivative, and an amine oxide, the aqueous fluid having a pH of at least 5.

23. An aqueous foamable fluid according to claim 22 wherein the at least one mono-(aliphatic hydrocarbyl) phosphate ester comprises a compound of formula (I)

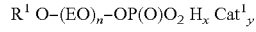
R$^1$ O–(EO)$_n$–OP(O)O$_2$ H$_x$ Cat$^1_y$ where:
R$^1$ is an aliphatic hydrocarbyl group;

EO is an ethyleneoxy group
n is from 0 to 1;
$Cat^1$ is a cation having monovalent cationicity;
x is from 0 to 1;
y is from 1 to 2; and x+y=2.

24. An aqueous formable fluid as claimed in claim 23 wherein $Cat^1$ comprises a potassium ion or a cation derived from an alkanolamine.

25. An aqueous formable fluid as claimed in claim 24 comprising an alkanolamine selected from the group consisting of diethanolamine, triethanolamine, methyldiethanolamine and ethyldiethanolamine.

26. An aqueous foamable liquid according to claim 22 wherein the foam stabilizer comprises an alkyl ether sulphate surfactant of the formula:

$$R^2-(OCH_2-CH_2)_{m-OSO_3} Cat^2$$

where:
$R^2$ is a $C_8$ to $C_{16}$, more usually a $C_{10}$ to $C_{14}$, and especially a $C_{12}$, alkyl group;
m is from 1 to 10,
$Cat^2$ is a cation having monovalent cationicity.

27. An aqueous foamable liquid according to claim 22 wherein the foam stabilizer comprises a fatty acid alkanolamide derivative of the formula (IV):

$$R^4-CONH-(AO)_mH \qquad (IV)$$

where
$R^4$ is $C_8$ to $C_{22}$ hydrocarbyl;
AO is alkyleneoxy; and
m is from 1 to 10.

28. An aqueous foamable fluid containing a foaming agent according to claim 22, wherein the phosphate ester is a potassium and/or alkanolamine and/or alkylalkanolamine salt.

* * * * *

UNITED STATES PATENT AND TRADEMARK OFFICE
CERTIFICATE OF CORRECTION

PATENT NO.         : 7,055,628 B2
APPLICATION NO. : 10/493628
DATED                  : June 6, 2006
INVENTOR(S)        : Grainger et al.

It is certified that error appears in the above-identified patent and that said Letters Patent is hereby corrected as shown below:

Column 18, line 67, reads "$R^1O\text{-}(EO)_n\text{-}OP(O)O_2H_xCAT^1_y$," should read
-- $R^1O\text{-}(EO)_n\text{-}OP(O)O_2H_xCAT^1_y$ --
Column 19, line 3, reads "group" should read -- group; --
Column 19, line 4, reads "from0" should read -- from 0 --
Column 19, line 18, reads "$R^2\text{-}(OCH_2CH_2)_{m\text{-}OSO_3}Cat^2$" should read
-- $R^2\text{-}(OCH_2\text{-}CH_2)_m\text{-}OSO^3Cat^2$ --
Column 19, line 22, reads "1 to 10," should read -- 1 to 10; --
Column 19, line 49, reads "collapses, to" should read -- collapses to --
Column 20, line 5, reads "a-reformed" should read -- a reformed --
Column 20, line 21, reads "$R^1O\text{-}(EO)_{n\text{-}OP(O)O2}H_xCAT^1_y$," should read
-- $R^1O\text{-}(EO)_n\text{-}OP(O)O_2H_xCAT^1_y$ --
Column 20, line 25, reads "EQ" should read -- EO --
Column 20, line 25, reads "group" should read -- group; --
Column 20, line 44, reads "1 to 10," should read -- 1 to 10; --
Column 20, line 45, reads "$Cat_2$" should read -- $Cat^2$ --
Column 20, line 56, reads "agent, at least" should read -- agent, comprising at least --
Column 21, line 1, reads "group" should read -- group; --
Column 21, line 16, reads "$R^2\text{-}(OCH_2\text{-}CH_2)_{m\text{-}OSO_3}Cat^2$" should read
-- $R^2\text{-}(OCH_2\text{-}CH_2)_m\text{-}OSO_3Cat^2$ --
Column 22, line 1, reads "1 to 10," should read -- 1 to 10; --

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,055,628 B2  
APPLICATION NO. : 10/493407  
DATED : June 6, 2006  
INVENTOR(S) : Grainger et al.

Page 1 of 1

It is certified that error appears in the above-identified patent and that said Letters Patent is hereby corrected as shown below:

Column 18, line 67, reads "$R^1O\text{-}(EO)_n\text{-}OP(O)O_2H_xCAT^1_y$," should read
-- $R^1O\text{-}(EO)_n\text{-}OP(O)O_2H_xCAT^1_y$ --
Column 19, line 3, reads "group" should read -- group; --
Column 19, line 4, reads "from0" should read -- from 0 --
Column 19, line 18, reads "$R^2\text{-}(OCH_2CH_2)_{m\text{-}OSO3}Cat^2$" should read
-- $R^2\text{-}(OCH_2\text{-}CH_2)_m\text{-}OSO^3Cat^2$ --
Column 19, line 22, reads "1 to 10," should read -- 1 to 10; --
Column 19, line 49, reads "collapses, to" should read -- collapses to --
Column 20, line 5, reads "a-reformed" should read -- a reformed --
Column 20, line 21, reads "$R^1O\text{-}(EO)_{n\text{-}OP(O)O2}H_xCAT^1_y$," should read
-- $R^1O\text{-}(EO)_n\text{-}OP(O)O_2H_xCAT^1_y$ --
Column 20, line 25, reads "EQ" should read -- EO --
Column 20, line 25, reads "group" should read -- group; --
Column 20, line 44, reads "1 to 10," should read -- 1 to 10; --
Column 20, line 45, reads "$Cat_2$" should read -- $Cat^2$ --
Column 20, line 56, reads "agent, at least" should read -- agent, comprising at least --
Column 21, line 1, reads "group" should read -- group; --
Column 21, line 16, reads "$R^2\text{-}(OCH_2\text{-}CH_2)_{m\text{-}OSO3}Cat^2$" should read
-- $R^2\text{-}(OCH_2\text{-}CH_2)_m\text{-}OSO_3Cat^2$ --
Column 22, line 1, reads "1 to 10," should read -- 1 to 10; --

This certificate supersedes Certificate of Correction issued January 16, 2007.

Signed and Sealed this

Sixth Day of February, 2007

JON W. DUDAS  
*Director of the United States Patent and Trademark Office*